US007003779B2

(12) United States Patent
Riosa et al.

(10) Patent No.: US 7,003,779 B2

(45) Date of Patent: Feb. 21, 2006

(54) HIERARCHICAL CONNECTED GRAPH MODEL FOR IMPLEMENTATION OF EVENT MANAGEMENT DESIGN

(75) Inventors: James A. Riosa, Wiarton (CA); Andrew D. Naiberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/059,894

(22) Filed: Feb. 17, 2005

(65) Prior Publication Data

US 2005/0144624 A1 Jun. 30, 2005

Related U.S. Application Data

(62) Division of application No. 09/747,439, filed on Dec. 21, 2000, now Pat. No. 6,931,644.

(51) Int. Cl.
*G06F 9/44* (2006.01)

(52) U.S. Cl. ...................... 719/318; 719/316; 709/224; 709/223

(58) Field of Classification Search ................ 719/318, 719/316; 709/223, 224
See application file for complete search history.

(56) References Cited

U.S. PATENT DOCUMENTS

| | | | | |
|---|---|---|---|---|
| 4,980,824 A | | 12/1990 | Tulpule et al. | 364/200 |
| 5,414,812 A | * | 5/1995 | Filip et al. | 707/103 R |
| 5,504,851 A | | 4/1996 | Maesano et al. | 395/157 |
| 5,528,516 A | | 6/1996 | Yemini et al. | 364/551.01 |
| 5,634,016 A | | 5/1997 | Steadham, Jr. et al. | 395/329 |
| 5,661,668 A | * | 8/1997 | Yemini et al. | 702/186 |
| 5,713,045 A | | 1/1998 | Berdahl | 395/893 |
| 5,732,192 A | | 3/1998 | Malin et al. | 395/10 |
| 5,748,098 A | | 5/1998 | Grace | 340/825.16 |
| 5,809,235 A | | 9/1998 | Sharma et al. | 395/200.6 |
| 5,831,611 A | | 11/1998 | Kennedy et al. | 345/335 |
| 5,852,449 A | | 12/1998 | Esslinger et al. | 345/473 |
| 5,857,190 A | | 1/1999 | Brown | 707/10 |
| 5,867,822 A | | 2/1999 | Sankar | 705/8 |
| 5,872,931 A | | 2/1999 | Chivaluri | 395/200.53 |
| 5,881,315 A | | 3/1999 | Cohen | 395/872 |
| 5,920,314 A | | 7/1999 | Maesano et al. | 345/340 |
| 5,944,782 A | | 8/1999 | Noble et al. | 709/202 |
| 6,021,403 A | | 2/2000 | Horvitz et al. | 706/45 |

(Continued)

OTHER PUBLICATIONS

Thoenen, David et al. "Event Relationship Networks: A Framework for Action Oriented Analysis in Event management." Sep. 28, 2000.*

(Continued)

*Primary Examiner*—Lewis A. Bullock, Jr.
(74) *Attorney, Agent, or Firm*—John R. Pivnichny

(57) ABSTRACT

An automated method and system for the implementation of a hierarchical event relationship network for correlation analysis in a distributed computing environment in which events are defined based on a connected graph model. Event handling information for each event type to be monitored is used to customize a plurality of rule templates for each type within an event source, where the event source is a hardware component, an application software component or an operating system platform. A plurality of event relationship network rules are verified to ensure they do not violate an event protocol. A hierarchical class definition and naming structure is generated from the plurality of event relationship network rules for each event source. Event management rules are then generated automatically for each event type from the event relationship network rules and the rule templates. The event management rules are loaded into a rule-based event manager. The performance of the rule-based event manager is then monitored.

51 Claims, 8 Drawing Sheets

U.S. PATENT DOCUMENTS 6,272,537 B1 * 8/2001 Kekic et al. ................ 709/223
6,591,299 B1 * 7/2003 Riddle et al. ............... 709/224
6,629,106 B1 * 9/2003 Narayanaswamy et al. ....................... 707/104.1
6,662,206 B1 * 12/2003 Banavar et al. ............. 709/201
6,664,978 B1 * 12/2003 Kekic et al. ................ 715/733
6,697,791 B1 * 2/2004 Hellerstein et al. ........... 706/47
6,779,120 B1 * 8/2004 Valente et al. ................. 726/1
6,941,362 B1 * 9/2005 Barkai et al. ............... 709/223
6,941,557 B1 * 9/2005 Jakobson et al. ........... 719/316
2002/0143939 A1 * 10/2002 Riddle et al. ............... 709/224

OTHER PUBLICATIONS

Koch, Thomas et al. "Rules and Agents for Automated Management of Distributed Systems." Jun. 1996.*

"Audit Trail Support for Program Activity Implementations of Workflow Management Systems," *Research Disclosure*, Mar. 1998, pp. 309-310.

* cited by examiner

C

P

HIERARCHICAL CONNECTED GRAPH MODEL FOR IMPLEMENTATION OF EVENT MANAGEMENT DESIGN

This is a divisional of application Ser. No. 09/747,439 filed Dec. 21, 2000, now U.S. Pat. No. 6,931,644.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATION

This patent application is related to and contains common disclosure with co-pending and commonly assigned patent application "System, Method, and Protocol for Automated Implementation of Event Management and Monitoring System", Ser. No. 09/488,689, filed Jan. 20, 2000 now abandoned. The copending patent application is hereby incorporated by reference into this description as fully as if here represented in full.

TECHNICAL FIELD

The present invention is generally related to computer systems management. More particularly, the present invention relates to a method and system for the automated implementation of event management design and monitoring for a distributed computing environment.

BACKGROUND

System and network problems are complex and can surface in many different forms. Even a simple problem can leave behind a complex event trail. This can result in excessive confusion in problem determination efforts and unnecessary down time. However, in a well-tuned event management environment, event messages from sources such as application software, database monitors, system hardware and network management systems can often be linked together, or "correlated," to identify the root cause of a problem. Correlation minimizes resources required to resolve the problem and reduce the resulting cost incurred.

The system and network management software industry is focusing increased attention on products that offer support for the disciplines of distributed monitoring and event management. All major systems management vendors are aggressively marketing products that promise improved capabilities in the area of enterprise systems management. There are many products that are currently available in the market. Products include Tivoli Systems' Tivoli Enterprise Console (TEC) and NetView, Computer Associates' CA UniCenter, Hewlett-Packard's OpenView and Event Correlation Service, BMC's Software Patrol, CommandPost and MAXM products and VERITAS' NerveCenter Pro. The invention is described in the context of the Tivoli TEC as an exemplary platform, but the invention is not limited to the TEC platform. Those skilled in the art will realize that many modifications and adaptations to the present invention are possible, and may even be desirable, in certain circumstances and are considered part of the present invention.

While computer networking customers may choose a broad range of event management product alternatives, there has been virtually no attention given by vendors of event management and monitoring products to develop methodologies and tools that assist the customers in effectively relating these event management and monitoring technologies to the specifics of their systems and distributed computing environments. As the individual customer's systems and distributed computing environment typically generate at least hundreds, if not thousands, of unique event messages, without systematic approaches to the tailored implementation of event management, and monitoring technologies, the resulting value to the user of these products is significantly reduced.

For the foregoing reasons, there is a need for a system and method that bridge the gap between the customer's unique systems and distributed computing event environments and the capabilities of an event management product.

SUMMARY OF THE INVENTION

This invention describes a set of linked activities and supporting automation tools that provide for the analysis and documentation of a customer's systems and distributed computing network monitoring and event processing requirements. This methodology is designed as a front-end to effective implementation of event management products such as Tivoli Enterprise Console (TEC), which is a platform described herein for exemplary purposes only. This methodology is open, i.e., capable of front-ending the implementation of any distributed monitoring or event management product, and the invention is not limited to any specific products. The output of the methodology includes a set of design documents that serve as input to effective customization of monitoring and event processing facilities and the development of complex event correlation rules. The methodology is supported by a set of personal computer-based analysis and documentation tools. This specification also describes a software implementation of the result of such methodology, thus preventing an ad hoc approach by individual implementers.

Event Management Design (EMD) is a process developed by IBM Corporation to define the policies and procedures for managing the flow of events in a distributed computing environment. This encompasses the identification of events, filtering practices, and correlation analysis. The process is product independent. At the end of the design, the client is presented with a set of spreadsheets and graphical representations for every source of events in their particular environment. The spreadsheets contain the listings of all events, their enterprise significance, the event significance, and their necessity for correlational analysis. The resulting drawings, using a product such as Visio, are graphic representations of the correlations. These two documents provide all the necessary information for implementing the design as a practical solution.

IBM has further extended EMD to include a design implementation as described in co-pending patent application Ser. No. 09/488,689 which is incorporated by reference herein. This invention provides extensions to the functionality of the tools used in EMD. It includes a spreadsheet that is used to aid in the development of Basic Recording of Objects in C (BAROC) files. Once certain detailed information is added to this sheet, it automatically builds the BAROC files, using whatever class names are provided. The drawing diagrams include code that allows for the generation of Tivoli Enterprise Console (TEC) rules, using specified basic rule templates developed by the EMD implementor. The new drawing code propagates the templates with appropriate class names as determined from the drawings, as well as adding in status and severity changes, timing delays, and locations of scripts to be executed.

There is a single drawing file for each type of unique event source (e.g., hardware device, operating system platform, application). The entire suite of correlation drawings define an Event Relationship Network (ERN). The ERN includes a series of pages which show the subset of correlation relationships. Each of these pages is called a subnet. Subnets may link to other subnets, spanning as many pages as required to fully represent the set of correlational relationships. To a certain extent, the set of events on a given subnet is somewhat arbitrary. There is a physical limitation to the number of events that can be placed on any given page, and the break from page to page is the decision of the implementor. On the other hand, a subnet may contain a complete logical set of relationships, especially when it does not span to any other pages.

DETAILED DESCRIPTION OF THE INVENTION

Figures 1, 2:
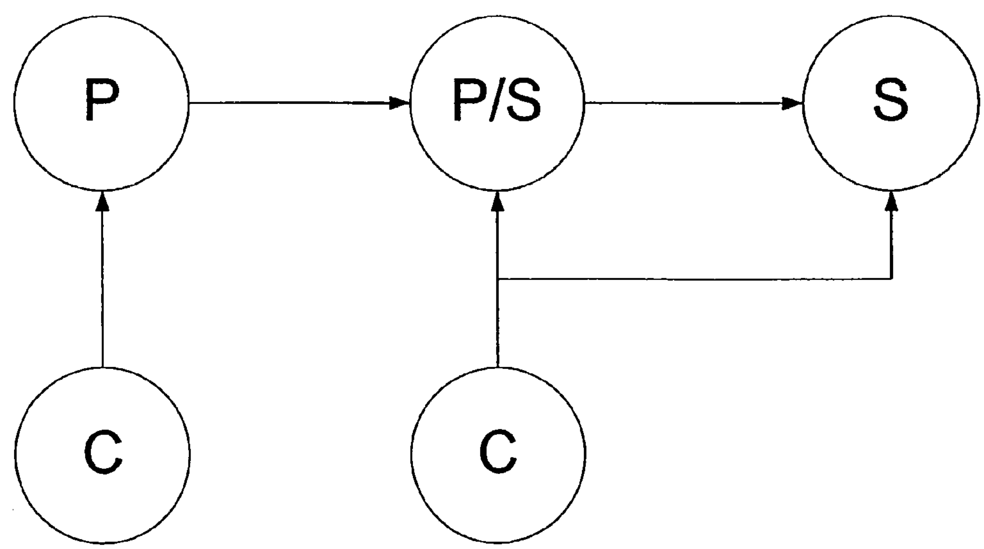
FIG. 1 illustrates an example of a correlation diagram having a single event with a clearing event.
FIG. 2 illustrates an example of a correlation diagram having a single chain of events with clearing events.

The Tivoli Enterprise Console is used in the following description as the operating platform to facilitate understanding of the present invention. Tivoli's Enterprise Console is a powerful event management and automation application that provides rules-based event correlation for various system components including network, hardware, database, and applications. It offers a centralized, global view of a distributed computing enterprise, while ensuring high availability of applications and computing resources. The Enterprise Console has three primary features that distinguish it from other products: event integration, event processing, and event response and notification. The Enterprise Console receives, processes, and automatically responds to system events, such as a database server being down, a network connection being lost, or a batch processing job completing successfully. It acts as a central collection point for alarms and events from a variety of sources.

In a classic Tivoli implementation, the relationship of each event in the correlational chain with each and every other event in the chain has to be considered. As such, a simple information function can be defined that determines the number of relationships that must be known and implemented for any given chain of events. If I(fn)n represents the information function for a set of n related events, then a classic implementation requires that the total number of states to be known is:

$$I(fn)n=n(n-1)$$

However, the event relationship can be treated not as a linear flow of events, but rather as a hierarchical connected graph. These graphs are defined as hierarchical since any event potentially contains (implicitly) the information of all the preceding events. If this were not the case, then correlational analysis could not be performed since, by definition, the events would share no common information, and would then be random, unrelated occurrences. By examining the set of events as a connected graph, the amount of information required to understand an individual event's relationship to any other event in its connected network can be reduced. If $n_i$ represents an element in the chain, and $p_i$ represents the number of paths the element is connected to within the graph, and if s=1 is defined to be the sequence position along the graph, and by default a single condition of information, then the total number of conditions that need to be known for any element is:

$$\begin{aligned} I(fn)n_i &= p_i + s \\ &= p_i + 1 \end{aligned}$$

For a chain of x events, the total number of states can be defined to be:

$$\Sigma I(fn)n_i \text{ for } i=1 \text{ to } x$$

If a chain of events is considered, starting with a single root cause event, which then has two branches with each branch containing four resultant events, then the following results illustrate the advantage of the present invention:

1. For a traditional Tivoli implementation, the total number of states that need to be known is:

$$\begin{aligned} I(fn)n &= n(n-1). \\ &= 9(8) \\ &= 72. \end{aligned}$$

In the case of a hierarchical connected graph, the number of states that need to be known is:

$$\begin{aligned} \sum I(fn)n \text{ for } i &= 1 \text{ to } x \\ &= 3+2+2+2+2+2+2+2+2 \\ &= 21. \end{aligned}$$

The first element represents the root cause (two branches plus one positional information equals three states). Since all other events only exist on a single path, they each have one branch plus one position equals two states. The propagation of this path and sequence information is done automatically by an EMD/IT tool, based on the constructs described herein.

Of the two driving purposes of TEC monitoring, i.e., 1) correlation to determine root cause, and 2) automated response to events, only the correlation problem is considered in this invention. In the present context, correlation analysis is defined as establishing a set of relationships where the ultimate causal event can be determined. This is the primary purpose of the TEC logic engine. Automated response to a causal event is not inherently built into the TEC code, but rather is the use of appropriate scripts executed in response to the determination of the causal event. As such, the scripts are external to the TEC code, and may vary among different implementations, depending on the system management process. The development of automated scripts is a separate process-driven function from correlation analysis.

The key elements of the present invention are as follows:

1. definition of events based on a connected graph model;
2. hierarchical naming convention to be used in the BAROC (Class Definition) files;
3. informational slot definitions required to effectively perform a correlation (root cause) analysis;
4. a basic ruleset template that handles all correlations; and
5. modifications to the software toolset described in co-pending patent application, Ser. No. 09/488,689 to automate the correlation process.

The present invention has a number of advantages as described in this paragraph. BAROC file class definition structure and naming structure are standardized. The naming conventions and structure are integrated into the logical design resulting from EMD. The logical flow of event correlation is totally reflected in the BAROC files. Any support person can now work through the logical structure without having access to the original EMD material. Path and sequence identification (ID) searches to determine event status is more efficient than current methods permit. It reduces the requirement to search the entire event cache for multiple events. By integrating the EMD results, BAROC files and rule sets, a system is created that lends itself to well-governed change management procedures. No changes can be made on any single component without affecting the others. As such, any change will require a comprehensive review of the logical structure, and the implications for the implementation. Documentation of changes is a requisite to maintain the integrity of the integration. By reducing to six the number of essential templates, implementation can be faster, and the skill level required to implement is reduced accordingly. A rulebase and BAROC structure are created that are consistent across the enterprise.

In order to make the most efficient use of the logic engine, only one event within a given set of causal relationships can be available for correlation at any given time. All other events will have some aspect of their status changed to remove them from future correlation analysis. There are many ways in which this can be achieved. The event can be dropped, closed, its severity changed, or a new slot can be created for all events which can be flagged for its status as a correlation candidate. The ultimate goal is that at any given time, a console can be viewed and the only events appearing would be the best estimate of a causal event at that given time.

The description of the logical flow of events in a given system makes use of the following definitions:

Autonomous Events: These are isolated events. In other words, they can have no causal events, nor can they be a proximate cause for any other event. There can also be no clearing events for autonomous events. As such, these events will never appear in a Visio diagram, as there is no logic flow associated with their existence. All autonomous events are handled by a single rule as defined by policy, i.e., duplicate detection, escalation, trouble ticketing, etc.

Primary Event: This can also be defined as the root cause event. It can have no precedent events, but may have any number of ancillary events as a result of its existence.

Primary/Secondary Event: This event can be either a causal event, or can be the result of some other event distal to the root cause event.

Secondary Event: This event can only result from some other event distal to the root cause event. It can never occur spontaneously, nor can it be the causal event for any other event.

Clearing Event: This event signals a return to some defined steady state or normal status. A single clearing event can clear multiple events. A clearing event can never have a causal precedent.

Subnet: A subnet is the set of events with appropriate logical flow completely diagrammed. It is represented by a single page within an ERN. A subnet can be autonomous, causal, or secondary to other subnets, and by inference, other events.

Connector: The connector identifies the direction of logical flow. Using these definitions we can now redefine the several types of events as follows:

Autonomous Event: has no connectors associated with it.

Primary Event (P): can have n connectors flowing away from it; must have zero connectors flowing into it, with the exception of a connector from a clearing event.

Primary/Secondary Event (P/S): can have n connectors flowing into it; can have m connectors flowing out of it.

Secondary Event (S): can have n connectors flowing into it; must have zero connectors flowing out from it.

Clearing Event (C): can have n connectors flowing out from it; must have zero connectors flowing into it.

Subnets can be defined under the same requirements. As such, there can be autonomous subnets, primary subnets, primary/secondary subnets, or secondary subnets. There is no such thing as a clearing subnet.

FIG. 1 illustrates an example of a single event with a clearing event. This is probably the simplest type of correlation possible. A single event occurs, and since it is neither caused by any other event, nor does it cause any other event, it is by definition a primary event. The only event associated with it is a clearing event that signals a return to normal events.

FIG. 2 illustrates an example of a single chain of events with clearing events. This represents a more typical system of correlation, where there is a single chain of causal events, and a set of explicitly defined clearing events. It should be noted that the event that clears both the primary/secondary event and the secondary event is normally represented in Visio as only clearing the primary/secondary event, since clearing of the secondary event is implied by the logical event flow. The explicit clearing in this case is a requirement under the automation system currently used by the EMD implementation in Tivoli Enterprise Console (TEC). The above system better expresses the definition of a subnet, where there is a complete set of events and logical flow designed. A point to consider, which is described further below, is that only the causal chain of events are required for correlation analysis, since the clearing events are restricted to the local subnet. As such, the concept of a path or paths of causal events within a subnet is important to bear in mind.

Figure 3:
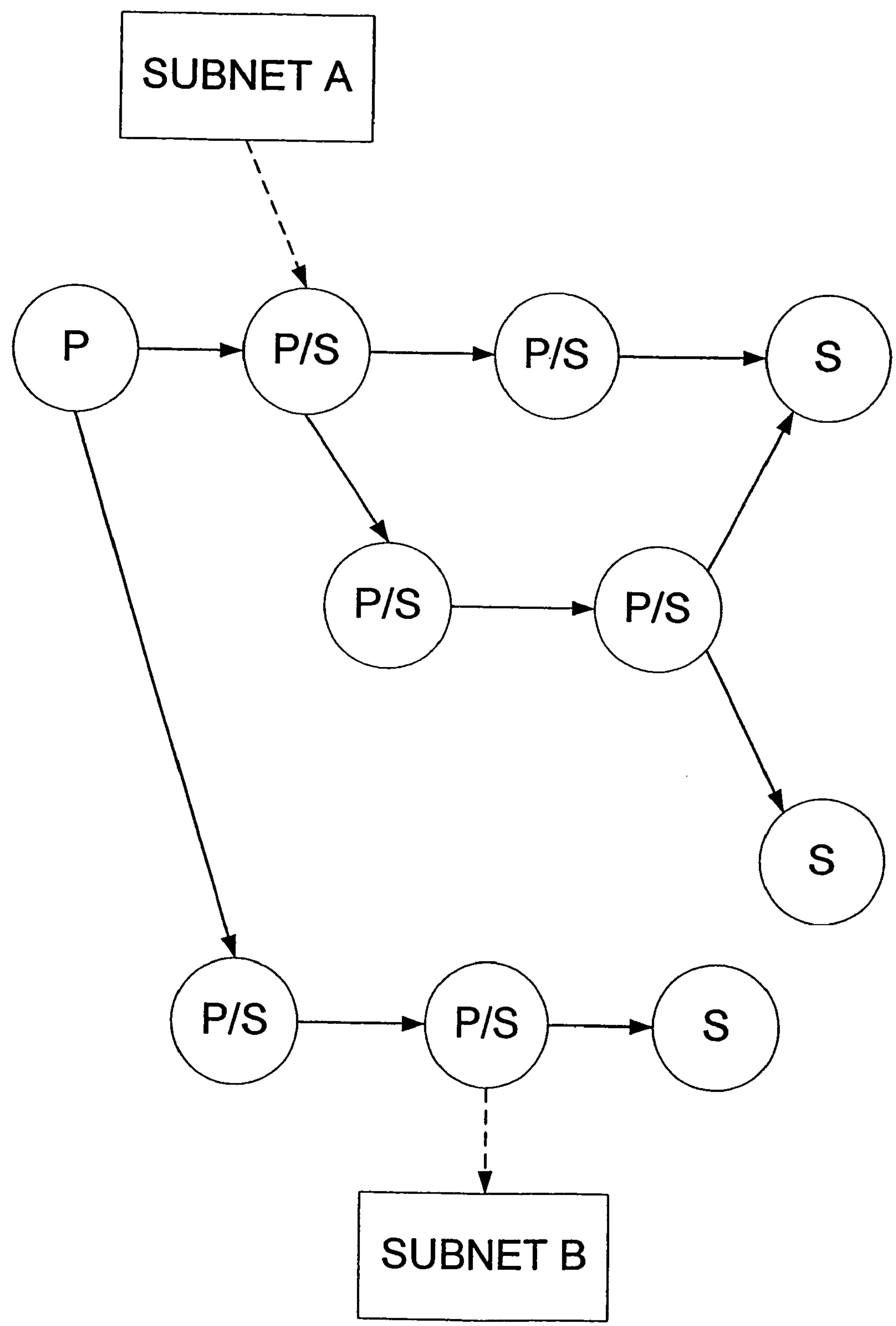
FIG. 3 illustrates an example of a complex correlation diagram.

FIG. 3 illustrates an example of a complex correlation diagram. Intrinsic to this is the internal subnet, which consists of a single primary event, multiple primary/secondary and secondary events. Subnet A represents a causal subnet to one chain of logical flow, while Subnet B is a secondary subnet resultant from a single primary/secondary event. The logical flow illustrates the possibility of multiple paths from any particular event, as well as the possibility for multiple flow into any given event. This example provides all the necessary complexity to illustrate the principles for event management design of the present invention.

The necessary and sufficient conditions for correlation analysis are as follows:

1. the position of any event on a logical directed graph can be defined by two terms—path identification and sequence identification;
2. since the events may belong to multiple paths, the path identification must be a list of integers, conceptually, this is the set of all paths that flow through any given event;
3. the sequence identification is a single integer that defines the relative position of the event on the path or paths.

Events can then be redefined in the following expressions of path ID and sequence ID:

Primary Event: Path ID={1,2,3, . . . n}; Sequence ID=0. Since the event is the root cause, it can be defined as its own class, and all other events flowing from it become a subclass of it. This accelerates the search process.

Primary/Secondary Event: Path ID={1,2,3, . . . n}; Sequence ID $\epsilon${n, n+1, . . . m}.

Secondary Event: Path ID={1,2,3, . . . n}; Sequence ID=maximum integer value for any of the paths of which it is a member.

Clearing Event: Path ID={−1,−2,−3 . . . −n}; Sequence ID=0. The negative path ID is required to signal that this is a clearing event, and not a candidate for root cause correlation.

Implicit to this is that any event that is cleared by this event has knowledge of the negative path ID associated with it.

Therefore, the only necessary condition required to determine the relative causal status of an event is as follows:

Step 1: Is the event in the path of a known event?

If yes, go to step 2.

If no, the event is the current primary event.

Step 2: What is the sequence ID of the event?

If the event sequence number is greater than the known event in the path, then the event is a secondary event, and is removed from further correlational analysis. If the event sequence number is less than the known event in the path, then the event is the current primary event, and the previous known event is removed from further correlational analysis. It is necessary at this time to reiterate that only one event within a given path will remain open for correlation at any given time.

The above-described meta-algorithm is sufficient to determine the status (i.e., primary or secondary) of any event within a given subnet. A problem occurs when multiple subnets are introduced. Logically, the above algorithm can be extended through all connected subnets, but the problem becomes one of propagating all the path IDs in a consistent manner. This is not a true NP-hard problem, but is bounded by a very large polynomial time signature. However, by synthesizing the subnet names with the BAROC class definitions, the search process can be minimized to class structure only.

Unfortunately, simply identifying a subnet as a BAROC class is not sufficient. It is not inconceivable, and is actually probable, that only one path within a subnet leads to another subnet, and there may be other events within the primary subnet that should not be correlated with the secondary subnet. If all events in that subnet were events defined as descendant to the metaclass named for the subnet, then the process would result in spurious correlations. As such, a structure for BAROC class names and hierarchy needs to be defined that reflects the logical flow of events. The following is an exemplary structure for BAROC class naming.

ERN_Class: All events within an event source (Lotus Notes, AIX, Cisco) become members of this class.

ERN_Autonomous: All autonomous events go in this class, since they are handled by a single rule that handles issues like duplicate detection, trouble ticketing, etc. This is a descendant class of Event_Class.

Subnet Class: All events in the subnet become members of this class. It is also a descendant class of ERN_Class.

Subnet Clearing: All clearing events are in this class. This is a descendant class of ERN_Class.

Figure 4:
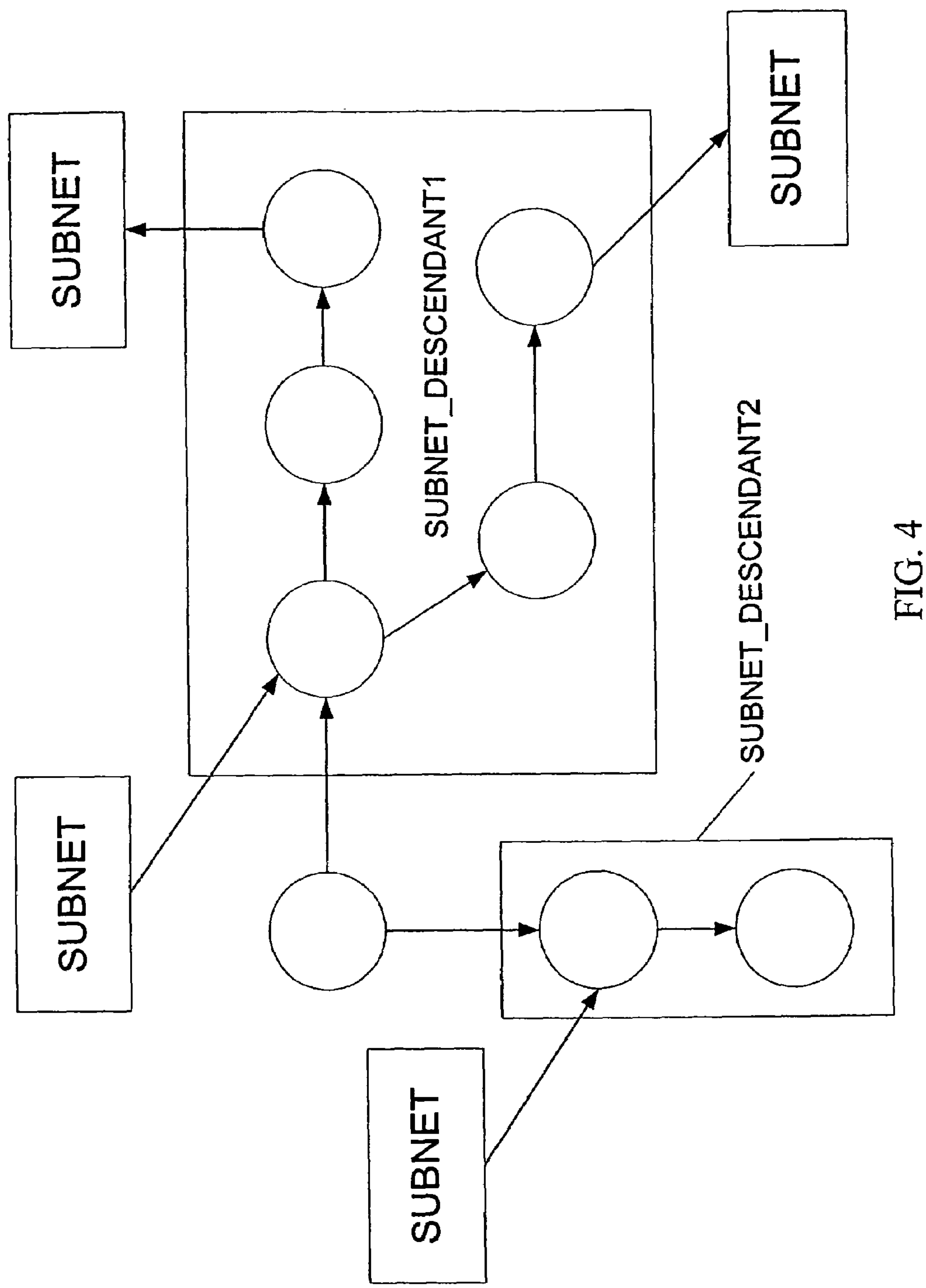
FIG. 4 illustrates a subnet descendant class structure of the present invention.

If the subnet has no connections to other subnets, then this is the finest resolution necessary. All internal correlations are dependent on path ID and sequence ID, so there will be no searching of classes beyond the Subnet_Class level. If the subnet does connect to other subnets, then the following class structures must be incorporated:

Subnet_Descendant#: If elements of the subnet are secondary to events on another subnet, than all events in the direct flow from the primary subnet entry point are members of this class. It is a descendant class of ERN_Class. The # value is merely indicative that there may be multiple flows within the subnet that need to be considered as separate classes. The subnet descendant class structure is illustrated in FIG. 4.

Figure 5:
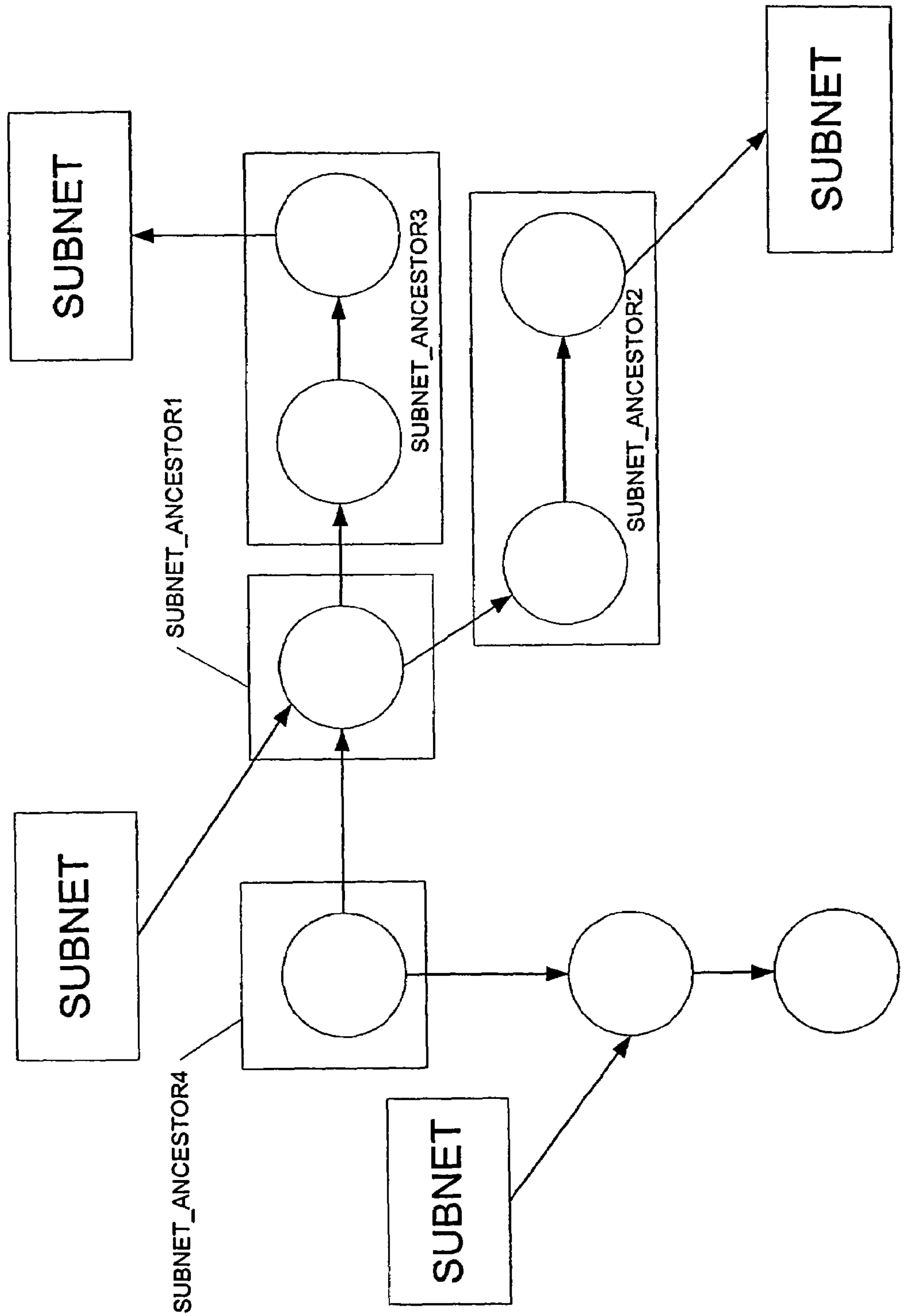
FIG. 5 illustrates a subnet ancestor class structure of the present invention.

Subnet_Ancestor#: This is the logical inverse of Subnet_Descendant. However, it poses some unique problems. The general definition is that if elements of a subnet are primary to another subnet, then those elements are a member of the class Subnet_Ancestor. These may be either descendant to ERN_Class or Subnet_Descendant, depending on the logical structure. Unlike Subnet_Descendant, not everything in the flow can be placed into one class. The problem comes when there are branches in the logical flow that lead to multiple subnets. In order to make class naming discrete, the following structure must be used. A nodal event is defined as one that has n paths flowing out of it. A proximal nodal event is one that is closer to the root cause event of the entire path, while a distal nodal event is one that is farther away. The terminal event is the event where the path flows to the next subnet, and is essentially a specialized distal nodal event. Events are then clustered into Subnet_Ancestor classes by following a simple rule. All events assigned to a specific Subnet_Ancestor are from a distal nodal event to the next most proximal nodal event. However, the cluster does not include that proximal event. The subnet ancestor class structure is illustrated in FIG. 5.

The correlation template described in co-pending patent application, Ser. No. 09/488,689 is modified as described below:

1. The following slots need to be defined in a BAROC file immediately descendant from root.baroc (the ancestral class definition for all events): path_id, sequence_id, descendant_class, and ancestral_class. The path_id will be a list of integers, the sequence_id is a single integer, and the descendant_class and ancestral_class are both a list of string names as defined in the BAROC file.

Figure 6:
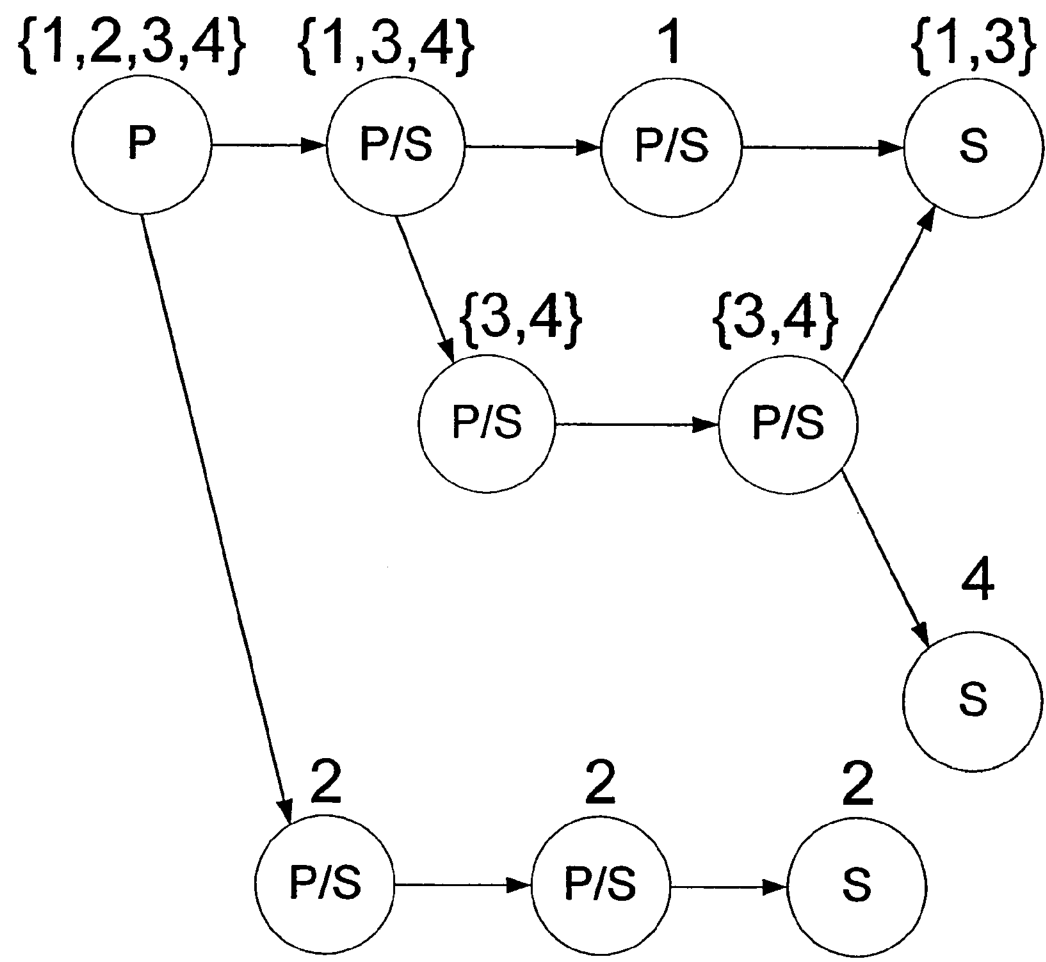
FIG. 6 illustrates the complex correlation diagram of FIG. 3 with path identification numbers added.
Figure 7:
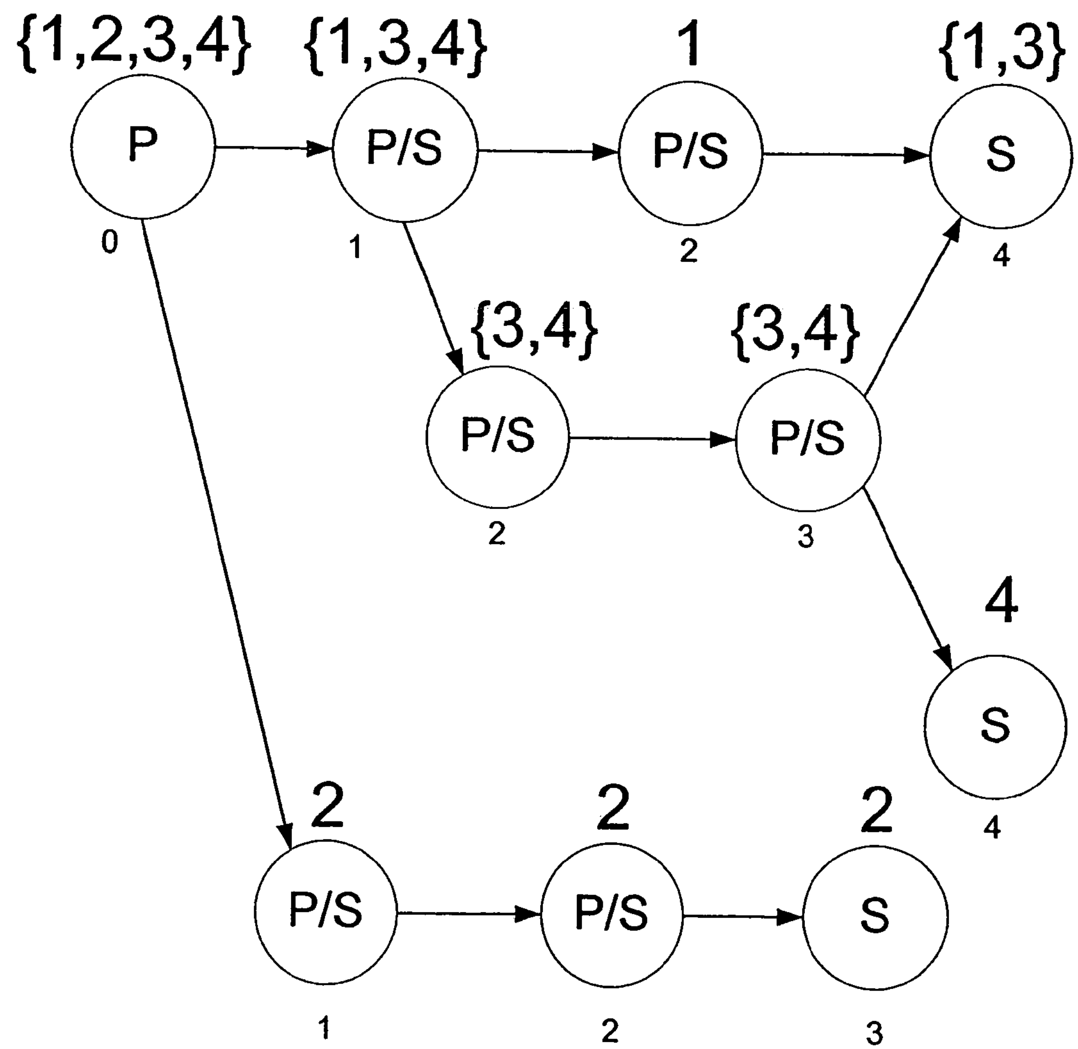
FIG. 7 illustrates the complex correlation diagram of FIG. 3 with path identification and sequence identification numbers added.

2. For any event on a subnet which has either primary or secondary subnets, and where that event lies in a logic flow that it connects to those subnets, it will have its ancestral_class slot populated with a list of all Subnet_Ancestor names for all classes which are primary to it and lie on the logical flows. The converse situation is used for Subnet_Descendant to populate the descendant_class slot.
3. Path_ID slot is propagated with the list of all the path numbers that the event is relevant to within its own ERN. An example is illustrated in FIG. 6 and described in the discussion on the propagation of path ID numbers below.
4. Sequence_ID slot is filled with the appropriate sequence number for that path. An example is illustrated in FIG. 7 and described in the discussion of sequence ID numbers below.

The generic correlation template becomes:

Step 1: For any event of class within Subnet_Ancestor; if present, make the current event secondary, and remove from future correlational analysis.

Step 2: For any event of class within Subnet_Descendant, if present, make the current event the primary event, and remove the older event from future correlational analysis.

Step 3: For any event on the subnet (Subnet_Class) where the Path_ID of the current event intersects the Path_ID of the older event; if the current event sequence_ID<older event sequence_ID, make the current event primary and remove the older event from future correlational analysis; if the current event sequence_ID>older event sequence_ID, remove the current event from future correlational analysis, as it is a secondary event.

Step 4: If all of the above conditions fail, then de facto this is the primary event.

This describes the most general case for analysis. If the event had been identified in the EMD design as a true primary event, then step 1, and the second half of step 3, can be removed from the analysis, since by definition a true primary event can never be secondary to anything else. Similarly, for a true secondary event, step 2, and the first half of step 3, can be removed since a secondary event can never have any events following it.

All templates can also include conditions for duplicate detection, trouble ticket forwarding, scripts to be fired, etc. These conditions are determined through a final workshop with the appropriate subject matter experts (SMEs) and follow a template similar to the document in the appendix.

The propagation of path ID numbers is as follows:

Step 1: Path ID numbers are contained in the set {1, 2, n+1 . . . m}.

Step 2: Starting at the root event of the ERN (either a primary or primary/secondary event) proceed to the first nodal event. The path leading in by default is path 1. At the nodal event, one path leading out continues to be the inherited path coming in. The remaining paths are assigned an ascending sequence of path IDs.

Step 3: Proceed to the next nodal event on any path and repeat the procedure. Note that no path ID number can be reused. You must always assign the next path number in the sequence.

Step 4: Back propagate the paths. For example, consider a simple two branch system. The events on path 1 that are precedent to the nodal event where path 2 arises are, by definition, also members of path 2. Therefore their path_id slot must contain both numbers in its list.

FIG. 6 illustrates the complex correlation diagram of FIG. 3 with path ID numbers added. The propagation of sequence ID numbers is as follows:

Step 1: Sequence ID numbers are contained in the set {1,2, n+1 . . . m}. Each event has one unique ID number.

Step 2: Starting at the root event for the ERN, assign the sequence ID numbers down one complete path. Return to the first nodal event, and continue to assign the numbers for that path, increasing from the current sequence ID of that nodal event. For example, if the nodal event has a sequence ID of 3, then the next element down any path must be 4. This process is repeated until complete.

Step 3: The only deviation occurs if one event is fed by two paths. At this point, that event should take the greater of the two values, and any events that follow it in the logical sequence should be increased accordingly. It is not required that the sequence ID's be a perfect n+1 increment, only that the greater than/less than relationships be maintained along any path.

FIG. 7 illustrates the complex correlation diagram of FIG. 3 with path ID and sequence ID numbers added.

The procedures for automated rule generation extensions to the methodology described in co-pending patent application, Ser. No. 09/488,689 are as follows:

Step 1: The current methodology propagates a BAROC page using the event names as class names. It separates the autonomous and correlation candidate events. This facility needs to be retained for autonomous events. The BAROC file for correlated events is generated from the Visio drawings, propagating the appropriate slots.

Step 2: Meta_classes need to be named as per the defined convention.

Step 3: Visio diagrams currently verify the ERN for proper use of connectors, shapes, and subnet links. This process should be repeated.

Step 4: The Visio program then prompts for default values related to trouble ticketing, duplicate detection, status and severity changes, time to search the event cache, and locations of scripts to be executed. These values come from the final workshop with the subject matter experts (SMEs). It also requests the location of the templates to be used.

Step 5: The Visio program then defines the path and sequence ID numbers, and back propagates them into the appropriate parts of the BAROC file.

Step 6: The Visio program identifies primary and secondary subnets, and defines the ancestor and descendant classes as appropriate, and propagates those names into the respective slots on the BAROC file.

Step 7: The Visio program then generates the automated rules based on the assigned values and templates.

Step 8: The spreadsheet generates the BAROC files from the populated spreadsheet.

Step 9: The rule set and BAROC files are given a reality check by the implementor. If everything appears adequate, they are loaded for testing.

Figure 8:
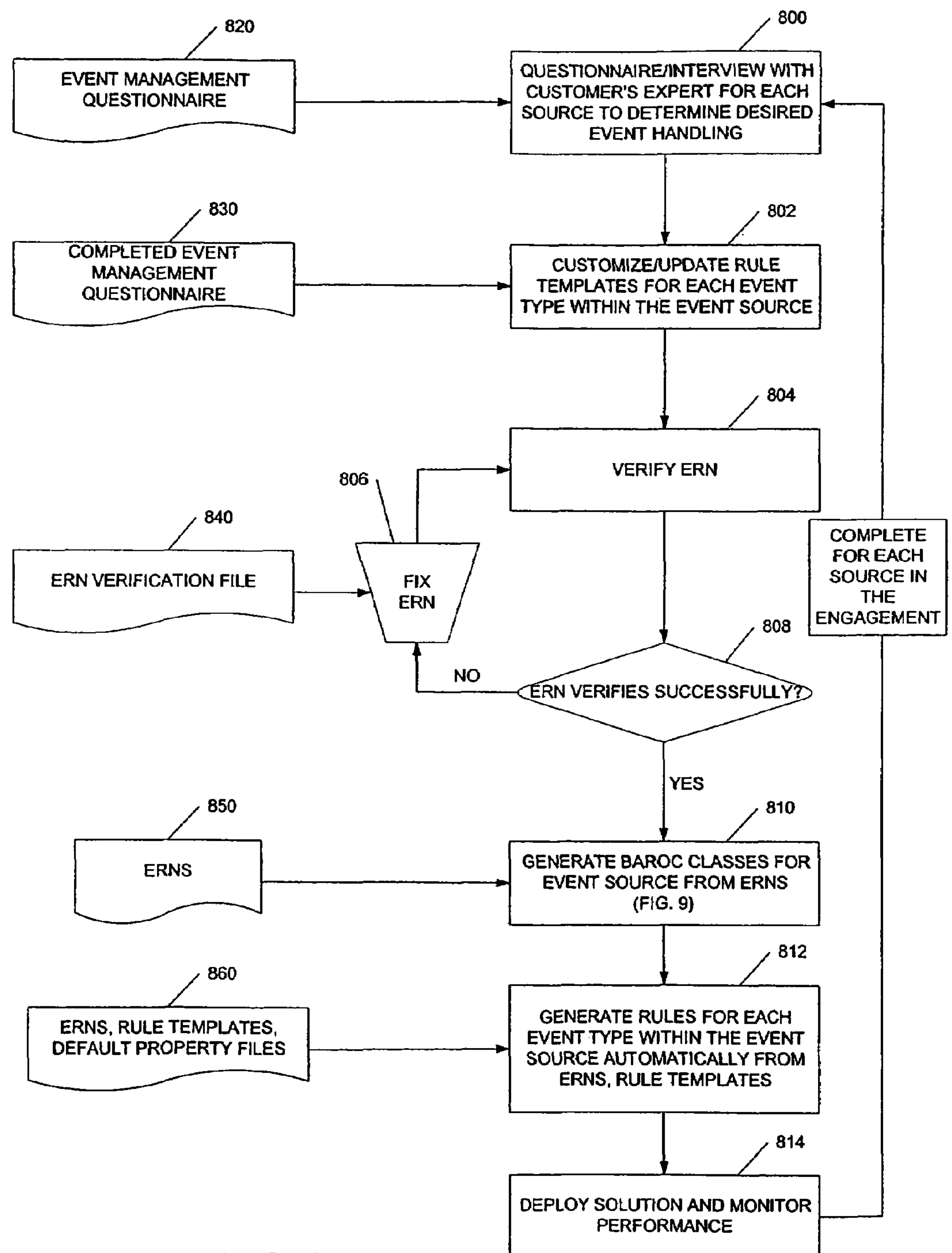
FIG. 8 illustrates the processing logic to define an Event Relationship Network (ERN) in accordance with an exemplary embodiment of the present invention.

FIG. 8 illustrates the processing logic for the generation of ERNs that include BAROC classes. This is an extension of the processing logic for the generation of ERNs described in co-pending patent application, Ser. No. 09/488,689, previously incorporated by reference. Processing starts in logic block 800 with the completion of event management questionnaire 820. The completed questionnaire is then used to customize and update rule templates for each event type within the event source as indicated in logic block 802. Customizing or updating the rule templates in logic block 802 includes adding, modifying and deleting rule actions and commands to perform the event management behavior desired by a particular customer. Once the behavior is specified, the tool fills in event names, subnet names, and related values as script names.

In logic block 804, the drawing files with ERNs are examined to verify that that the ERNs do not violate any protocols. This is followed in decision block 808 with a determination as to whether or not the ERNs in the generated ERN verification file have been successfully verified. If unsuccessful, the ERNs are fixed as indicated in logic block 806 before going through re-verification. The ERNs 850 are then used in logic block 810 to generate BAROC classes (using the processing logic illustrated in FIG. 9) for each event source. Next, in logic block 812, rules are generated for each event type within the event source automatically from the ERNs, rule templates, and default property files 860. The solution is then deployed and monitored as indicated in logic block 814.

Figure 9:
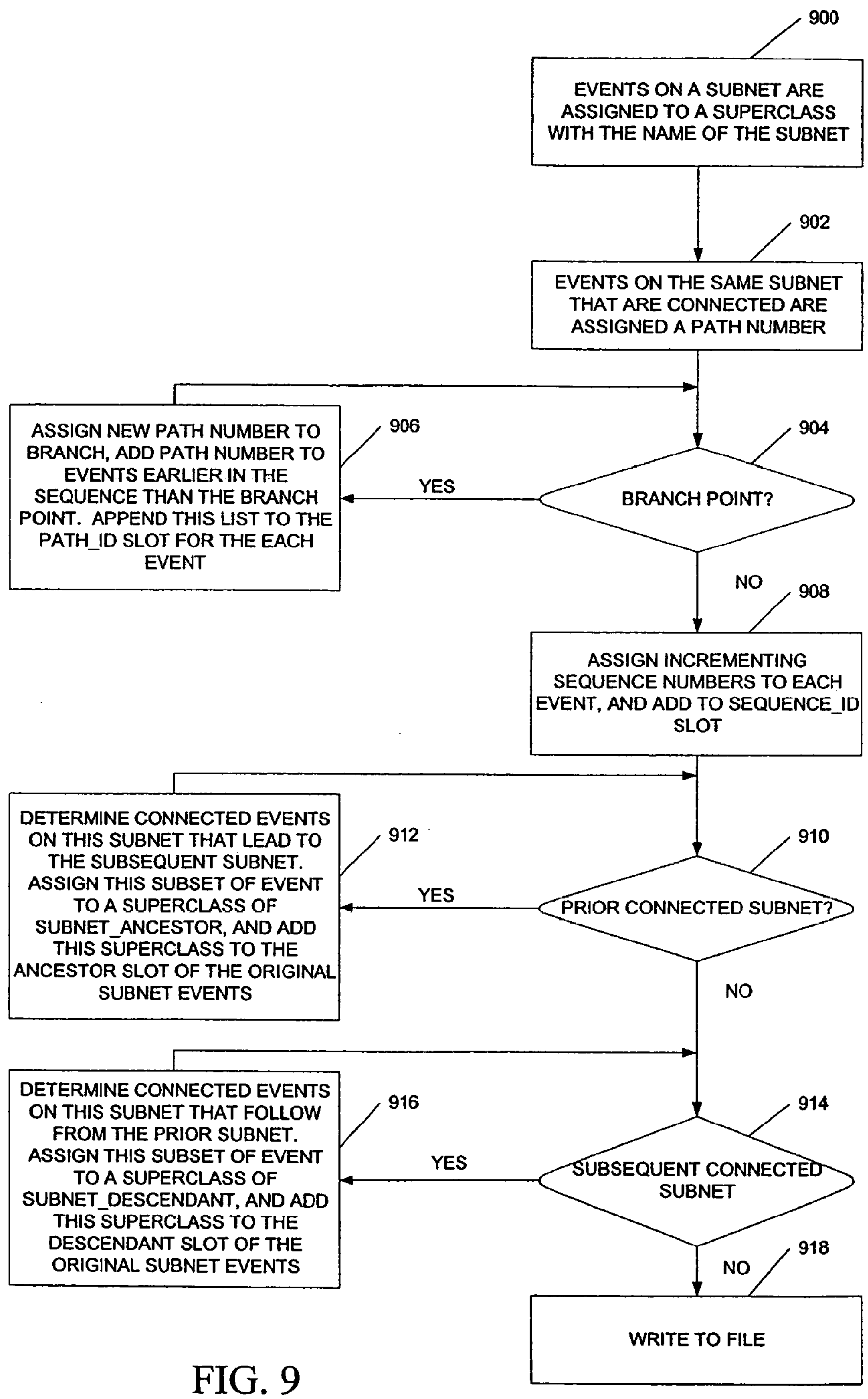
FIG. 9 illustrates the processing logic for generation of BAROC classes in accordance with a preferred embodiment of the present invention.

FIG. 9 illustrates the processing logic for the automated generation of BAROC files from ERNs, corresponding to logic block 810 in FIG. 8. Processing starts in logic block 900 which indicates that events on a subnet are assigned to a superclass with the name of the subnet. In logic block 902, connected events that are on the same subnet are assigned a path number. This step is followed in decision block 904 with a test for whether or not a branch point has been reached. If it has, then a new path number is assigned to the branch and the path number is added to events earlier in the sequence than the branch point. This list is then appended to the path_id slot for each event. These acts are indicated in logic block 906. If a branch point has not been reached, as tested for in decision block 904, then incrementing sequence numbers are assigned to each event and added to the sequence_id list as indicated in logic block 908.

The next step in the processing logic of FIG. 9 is the test for a prior connected subnet in decision block 910. If there is a prior connected subnet, then in logic block 912, the connected events on this subnet that lead to the subsequent subnet are determined, this subset of events is assigned to a superclass of Subnet_Ancestor, and the superclass is added to the ancestor slot of the original subnet events. If there is no prior connected subnet, processing continues as indicated in decision block 914 with a determination of whether or not there is a subsequent connected subnet. If there is subsequent connected subnet, then the acts indicated in logic block 916 are performed. These include a determination of the connected events on this subnet that follow from the prior subnet. This subset of events is assigned to a superclass of Subnet_Descendant, and the superclass is added to the descendant slot of the original subnet events. If there are no subsequent connected subnets in decsion block 914, the BAROC classes are written to a file as indicated in logic block 918.

The following is a template for a primary/secondary event. Elements enclosed in { } are variables that are assigned by the subject matter expert (SME) for implementation. As such, changes in severity, status, administrators, etc. are then automatically filled in by the tool to create a working rule.

```
rule: '{ernname}_primary_secondary_event':
(
/* Instantiate the required variable to perform correlation analysis
   within the event.
 * The determination of the state PS defines this rule as specific for
   primary/secondary events
 */
     event: _ps_event of_class '{ernname}_Event'
          where [state: equals 'PS',
          hostname: _hostname,
          date: _date,
          subnet: _subnet,
          path id: _path_id,
          sequence_id: _sequence_id,
          ancestor: _ancestor,
          descendant: _descendant,
          clearpath: _clearpath],
/* This is a conditional test if a clearing event, due to network variations,
   has arrived prior to the
 * event that it clear.
 * This also demonstrates the simple correlation algorithm for clearing
   events, and could be used
 * as the basis for a clearing rule.
 *
 * The specification of the subnet equality defines that the event is one of
a
   set of clearing events
 * that could possibly occur within a given subnet. The path_id, is
   required for more specific
 * correlation.
 *
 * The intersection of the path_id and clearpath is suffcient to define the
   complete clearing
 * correlation.
 */
     reception_action: 'Check_Clearing_Event':
(
          first_instance (event: _clr_event of_class
          '{ernname}_Event'
               where [subnet: equals_subnet
               state: equals 'C',
               origin: equals_origin,
               hostname: equals_hostname,
               status: within ['ACK', 'OPEN'],
               path_id: _clr_path_id
               ]),
          intersect(_clearpath, _clr_path_id),
          set_event_status(_ps_event,{status1}),
          set_event_severity(_ps_event, {severity1}),
          set_event_administrator(_ps_event, {administrator}),
/*
*         exec_prog(notification of clear),
*/
          commit_set
     ),
/* This action is a correlation to determine if the arriving event is a
   secondary event to an existing
 * root cause that may exist on another subnet. The entire correlation is
   defined in the call to search
 * the cache for an event within the metaclasses defined in the
   ancestor slot.
 */
          reception_action: 'Check_ancestor_Subnets':
     (
          first_instance(event: _anc_event of_class within_ancestor
               where [severity: outside ['HARMLESS'],
                    status: within ['ACK', 'OPEN']]),
          set_event_status(_ps_event, {status2}),
          set_event_severity(_ps_event, {severity1}),
          set event_administrator(_ps_event, {administrator}),
          link_effect_to_cause( ps_event, _anc_event),
/*
*         exec_prog("notification of secondary status")
*/
          commit_set
     ),
/* This action determines if the event under examination is secondary to
   events on the same subnet
 * as itself.
```

-continued

```
 * The subnet matching conditions are defined by the equality check on
the
   subnet slot.
 *
 * The correlation occurs in two statements. The intersection of the list of
   paths determines if there
 * is one path in common between the two events. If this condition is
   satisfied, then the success of
 * the relationships between the sequence id's will define the existing
   event as a secondary one to
 * an already exiting root cause.
 */
action: 'Check_ERN_Relations_Secondary':
     (
               first_instance(event: _related_event of_class
               '{ernname)_Event'
                    where [origin: equals _origin,
                    hostname: equals_hostname,
                    subnet: equals _subnet,
                    state: within ['PS', 'P'],
                    path_id: rel_path_id,
                    sequence_id:
                    relsequence_id outside [_sequence_id],
                    status: within ['ACK', 'OPEN']]),
          intersect(_path_id, _rel_path_id),
          _sequence_id > _rel_sequence_id,
          set_event_status(_ps_event, {status2}),
          set_event_severity(_ps_event, (severity1}),
          set_event_administrator(_ps event, {administrator}),
          link_effect_to_cause( _ps_event, _related_event),
/*
*         exec_prog(notification of secondary status),
*/
          commit_set
),
/* This action is a correlation to determine if the arriving event is
   a primary event to an existing root
 * cause event that may exist on another subnet. The entire correlation is
   defined in the call to search
 * the cache for an event within the metaclasses defined in the
   descendant slot.
 */
     reception_action: 'Check_Descendant_Subnets':
(
          first_instance(event:
          _desc_event of_class_within_descendant
               where [severity: outside ['HARMLESS'],
                    status: within ['ACK', 'OPEN']]),
          set_event_status(_desc_event, {status2})
     set_event_severity(_desc_event, {severity1}),
     set_event_administrator(_desc_event, {administrator}),
     link_effect_to_cause(_desc_event, _ps_event)
/*
*         exec_prog("notification of root cause status")
),
*/ This action determines if the event under examination is primary to
   events on the same subnet
 * as itself.
 * The subnet matching conditions are defined by the equality
   check on the subnet slot.
 *
 * The correlation occurs in two statements. The intersection of the list of
   paths determines if there
 * is one path in common between the two events. If this condition is
   satisfied, then the success of
 * the relationships between the sequence id's will define the existing
   event as a primary one to an
 * already existing root cause.
 */
     reception_action: 'Check_ERN_Relations_Primary':
(
          first_instance(event: _related_event of_class
          '{ernname}_Event'
               where [origin: equals_origin,
               hostname: equals_hostname,
               subnet: equals_subnet,
               state: within ['PS', 'S'],
               path_id: _rel_path_id,
               sequence_id:
```

-continued

```
               _rel_sequence_id outside [_sequence_id],
               status: within ['ACK', 'OPEN']]),
          intersect(_path_id, _rel_path_id),
          _sequence_id < _rel_sequence_id,
          set_event_status(_related_event, {status2}),
          set_event_severity(_related_event, {severity1}),
          set_event_administrator(_related_event, {administrator}),
          link_effect_to_cause(_related_event, _ps_event)
/*
*         exec_prog("notification of root cause status")
*/
     ),
/* If all of the above conditions have failed, then we may assume that
   the event arriving is,
 * in effect, a root cause event at this time. As such, we could notify
   immediately on this event.
 */
     reception_action: 'notify_on_primary':
(
/*
*         exec_prog("notification of root cause status"),
*/
          commit_set
     )
).
```

Obviously, there are any number of actions that can be taken at different levels. This is only one possible example, and is set by the policy workshop with the SMEs. A further implication is that the rules for primary events contain only the lower half of this rule, while secondary events contain the upper half. In a uniform environment, where all event sources are handled in an identical fashion and all possible types of events exist, there are a total of six rule sets: duplicate detection and trouble ticketing; autonomous events; primary events; primary/secondary events; secondary events; and clearing events.

The current state of the EMD-IT tool, while automating certain aspects of implementing an Event Management Design, has two limitations. The implementor is still required to create the ruleset templates to handle correlation, and to generate a rule for every type of event (primary, primary/secondary, secondary, and clearing event) for each subnet within the ERN. As such, there are a large number of rules generated, and the implementor is still required to develop the bulk of the code to do correlation. Also, while there is facility to generate BAROC files, this is a manual procedure to establish any hierarchical information.

This methodology provides a template with all the sufficient code to handle correlational analysis. The implementor only needs to add specific actions after the correlation is complete. These actions are comparatively simple and require little training to implement. Because of the nature of this type of correlation, only four rules are required for the entire ERN, rather than four rules for each rule on the ERN. Since the structure of the BAROC files in a well-mannered hierarchy is requisite for this model, BAROC file generation is now completely automated.

The present invention can be realized in software or a combination of hardware and software. Any kind of computer system or other apparatus adapted for carrying out the methods described herein is suited. A typical combination of hardware and software could be a general purpose computer system with a computer program that, when loaded and executed, controls the computer system such that it carries out the methods described herein. The present invention can also be embedded in a computer program product, which includes all the features enabling the implementation of the methods described herein, and which, when loaded in a computer system, is able to carry out these methods.

Computer program instructions or computer program in the present context means any expression, in any language, code or notation, or a set of instructions intended to cause a system having an information processing capability to perform a particular function, either directly or when either or both of the following occur: a) conversion to another language, code or notation; b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of the other features. Accordingly, the foregoing description of the preferred embodiment is provided for purpose of illustrating the principles of the present invention and not in limitation thereof, since the scope of the present invention is defined solely by the appended claims.

What is claimed is:

1. A computer-implemented method for the automated generation of a class definition and naming structure from an event relationship network represented by a hierarchical connected graph to perform correlation analysis in a distributed computing environment, comprising the acts of:

automatically assigning events in a subnet to a superclass defined with the same name as the subnet;

assigning a path number to connected events in the same subnet;

determining if a branch point has been reached in the connected graph;

if a branch point has been reached, assigning a new path number to the branch, adding the assigned path number to events that are earlier in the sequence than the branch point, and appending a list of events and assigned path numbers to a path identification slot for each event; and if a branch point has not been reached, incrementing a sequence number that is assigned to each event and adding the event sequence numbers to a sequence identification list.

2. The method for the automated generation of a class definition and naming structure from an event relationship network of claim 1 further comprising the act of determining if there exists a prior connected subnet for a current subnet.

3. The method for the automated generation of a class definition and naming structure from an event relationship network of claim 2 further comprising the acts of:

determining the subset of connected events on the prior connected subnet that lead to the current subnet;

assigning the subset of events to a subnet ancestor superclass; and adding the subnet ancestor superclass to an ancestor slot of the current subnet events.

4. The method for the automated generation of a class definition and naming structure from an event relationship network of claim 3 wherein the subnet ancestor class contains events that are primary to another subnet.

5. The method for the automated generation of a class definition and naming structure from an event relationship network of claim 4 wherein each event assigned to a subnet ancestor class is from a distal nodal event to a next most proximal nodal event on an event path.

6. The method for the automated generation of a class definition and naming structure from an event relationship network of claim 5 wherein a nodal event is an event that has a plurality of paths flowing from the event.

7. The method for the automated generation of a class definition and naming structure from an event relationship network of claim 6 wherein the distal nodal event is defined as an event that is farther away from a root cause event than a specified event on the event path.

8. The method for the automated generation of a class definition and naming structure from an event relationship network of claim 6 wherein a proximal nodal event is defined as an event that is closer to a root cause event than a specified event on the event path.

9. The method for the automated generation of a class definition and naming structure from an event relationship network of claim 2 further comprising the act of determining if there is a subsequent connected subnet for a current subnet.

10. The method for the automated generation of a class definition and naming structure from an event relationship network of claim 9 further comprising the acts of:

determining the subset of connected events on the subsequent connected subnet that follow from the current subnet;

assigning the subset of events to a subnet descendant superclass; and adding the subnet descendant superclass to a descendant slot of the current subnet events.

11. The method for the automated generation of a class definition and naming structure from an event relationship network of claim 10 wherein the subnet descendant class contains events that are in a direct flow from a primary subnet entry point.

12. The method for the automated generation of a class definition and naming structure from an event relationship network of claim 9 further comprising the act of writing a plurality of generated classes to a data file.

13. The method for the automated generation of a class definition and naming structure from an event relationship network of claim 1 further comprising the act of generating a generic correlation template.

14. The method for the automated generation of a class definition and naming structure from an event relationship network of claim 13 further comprising the acts of defining a path identification slot, a sequence identification slot, a descendant class and an ancestor class in a data file immediately descendant from a root cause event.

15. The method for the automated generation of a class definition and naming structure from an event relationship network of claim 14 wherein the path identification slot is propagated with a list of path numbers that an event is relevant to in the event relationship network.

16. The method for the automated generation of a class definition and naming structure from an event relationship network of claim 15 wherein the propagation of path identification numbers includes the acts of:

starting at a root node of the event relationship network, proceeding to a nodal event and defining a path leading in to the nodal event a path identification number of one;

at the nodal event, continuing the inherited path leading in as one path leading out from the nodal event and assigning each remaining path leading out from the nodal event an ascending sequence of path identification numbers;

proceeding to a next nodal event on any path leading out and repeating the acts performed at the nodal event of assigning each remaining path leading out from the nodal event an ascending sequence of path identification numbers; and propagating the path identification numbers backwards to ensure that events on a path precedent to the nodal event are contained in the list for the path identification slot.

17. The method for the automated generation of a class definition and naming structure from an event relationship network of claim 14 wherein the sequence identification slot is filled with a sequence number for the path.

18. The method for the automated generation of a class definition and naming structure from an event relationship network of claim 17 wherein the propagation of sequence identification numbers includes the acts of:

starting at a root node of the event relationship network, assigning the sequence numbers down a complete path;

for each nodal event, continuing to assign sequence numbers for each node down any path by increasing a current sequence identification number of each nodal event; and if an event is fed by more than one incoming path, assigning the event a sequence number that is the highest of each incoming path and increasing the sequence identification numbers of any events that follow a current nodal event in the logical sequence.

19. The method for the automated generation of a class definition and naming structure from an event relationship network of claim 14 wherein for any event on a subnet which includes a primary subnet and that lies in a logical flow connected to the primary subnet, populating the ancestor class slot with a list of all subnet ancestor class names which are primary to the event and lie on the logical flow.

20. The method for the automated generation of a class definition and naming structure from an event relationship network of claim 14 wherein for any event on a subnet which includes a secondary subnet and that lies in a logical flow connected to the secondary event, populating the descendant class slot with a list of all subnet descendant class names which are secondary to the event and lie on the logical flow.

21. The method for the automated generation of a class definition and naming structure from an event relationship network of claim 13 wherein the act of generating a generic correlation template comprises the acts of:

for an event of a class within a subnet ancestor class:

making a current event on the subnet a secondary event; and removing the current event from correlation analysis;

for an event of a class within a subnet descendant class:

making the current event on the subnet a primary event; and removing the current event from correlation analysis;

for an older event on the subnet in which the path identification of the current event intersects the path identification of the older event:

making the current event on the subnet a primary event and removing it from correlation analysis, if the sequence identification of the current event is less than the sequence identification of the older event; and making the current event on the subnet a secondary event and removing it from correlation analysis, if the sequence identification of the current event is greater than the sequence identification of the older event.

22. A computer readable medium containing a computer program product for the automated generation of a class definition and naming structure from an event relationship network represented by a hierarchical connected graph to perform correlation analysis in a distributed computing environment, the computer program product comprising:

program instructions that automatically assign events in a subnet to a superclass defined with the same name as the subnet;

program instructions that assign a path number to connected events in the same subnet;

program instructions that determine if a branch point has been reached in the connected graph;

program instructions that assign a new path number to the branch, add the assigned path number to events that are earlier in the sequence than the branch point, and append a list of events and assigned path numbers to a path identification slot for each event, if a branch point has been reached; and program instructions that increment a sequence number that is assigned to each event and add the event sequence numbers to a sequence identification list, if a branch point has not been reached.

23. The computer program product for the automated generation of a class definition and naming structure from an event relationship network of claim 22 further comprising program instructions that determine if there exists a prior connected subnet for a current subnet.

24. The computer program product for the automated generation of a class definition and naming structure from an event relationship network of claim 23 further comprising:

program instructions that determine the subset of connected events on the prior connected subnet that lead to the current subnet;

program instructions that assign the subset of events to a subnet ancestor superclass; and program instructions that add the subnet ancestor superclass to an ancestor slot of the current subnet events.

25. The computer program product for the automated generation of a class definition and naming structure from an event relationship network of claim 24 wherein the subnet ancestor class contains events that are primary to another subnet.

26. The computer program product for the automated generation of a class definition and naming structure from an event relationship network of claim 23 further comprising program instructions that determine if there is a subsequent connected subnet for a current subnet.

27. The computer program product for the automated generation of a class definition and naming structure from an event relationship network of claim 26 further comprising:

program instructions that determine the subset of connected events on the subsequent connected subnet that follow from the current subnet;

program instructions that assign the subset of events to a subnet descendant superclass; and program instructions that add the subnet descendant superclass to a descendant slot of the current subnet events.

28. The computer program product for the automated generation of a class definition and naming structure from an event relationship network of claim 26 further comprising program instructions that write a plurality of generated classes to a data file.

29. The computer program product for the automated generation of a class definition and naming structure from an event relationship network of claim 22 further comprising program instructions that generate a generic correlation template.

30. The computer program product for the automated generation of a class definition and naming structure from an event relationship network of claim 29 further comprising program instructions that define a path identification slot, a sequence identification slot, a descendant class and an ancestor class in a data file immediately descendant from a root cause event.

31. The computer program product for the automated generation of a class definition and naming structure from an event relationship network of claim 30 further comprising program instructions that propagate the path identification slot with a list of path numbers that an event is relevant to in the event relationship network.

32. The computer program product for the automated generation of a class definition and naming structure from an event relationship network of claim 31 wherein the program instructions that propagate path identification numbers includes:

program instructions that, starting at a root node of the event relationship network, proceed to a nodal event and define a path leading in to the nodal event with a path identification number of one;

program instructions that, for the nodal event, continue the inherited path leading in as one path leading out from the nodal event and assign each remaining path leading out from the nodal event an ascending sequence of path identification numbers;

program instructions that proceed to a next nodal event on any path leading out from the nodal event and assign each remaining path leading out from the next nodal event an ascending sequence of path identification numbers; and program instructions that propagate the path identification numbers backwards to ensure that events on a path precedent to the nodal event are contained in the list for the path identification slot.

33. The computer program product for the automated generation of a class definition and naming structure from an event relationship network of claim 30 wherein for any event on a subnet which includes a primary subnet and that lies in a logical flow connected to the primary subnet, program instructions that populate the ancestor class slot with a list of all subnet ancestor class names which are primary to the event and lie on the logical flow.

34. The computer program product for the automated generation of a class definition and naming structure from an event relationship network of claim 33 wherein the program instructions that propagate sequence identification numbers includes:

program instructions that, starting at a root node of the event relationship network, assign the sequence numbers down a complete path;

program instructions that, for each nodal event, continue to assign sequence numbers for each node down any path by increasing a current sequence identification number of each nodal event; and if an event is fed by more than one incoming path, program instructions that assign the event a sequence number that is the highest of each incoming path and increase the sequence identification numbers of any events that follow a current nodal event in the logical sequence.

35. The computer program product for the automated generation of a class definition and naming structure from an event relationship network of claim 30 wherein for any event on a subnet which includes a secondary subnet and that lies in a logical flow connected to the secondary event, program instructions that populate the descendant class slot with a list of all subnet descendant class names which are secondary to the event and lie on the logical flow.

36. The computer program product for the automated generation of a class definition and naming structure from an event relationship network of claim 29 wherein the program instructions that generate a generic correlation template comprise:

for an event of a class within a subnet ancestor class:

program instructions that make a current event on the subnet a secondary event; and program instructions that remove the current event from correlation analysis;

for an event of a class within a subnet descendant class:

program instructions that make the current event on the subnet a primary event; and program instructions that remove the current event from correlation analysis;

for an older event on the subnet in which the path identification of the current event intersects the path identification of the older event:

program instructions that make the current event on the subnet a primary event and remove it from correlation analysis, if the sequence identification of the current event is less than the sequence identification of the older event; and program instructions that make the current event on the subnet a secondary event and remove it from correlation analysis, if the sequence identification of the current event is greater than the sequence identification of the older event.

37. A computer-implemented system for the automated generation of a class definition and naming structure from an event relationship network represented by a hierarchical connected graph to perform correlation analysis in a distributed computing environment, comprising:

a component that automatically assigns events in a subnet to a superclass defined with the same name as the subnet;

a component that assigns a path number to connected events in the same subnet;

a component that determines if a branch point has been reached in the connected graph;

a component that assigns a new path number to the branch, adds the assigned path number to events that are earlier in the sequence than the branch point, and appends a list of events and assigned path numbers to a path identification slot for each event, if a branch point has been reached; and a component that increments a sequence number that is assigned to each event and adds the event sequence numbers to a sequence identification list, if a branch point has not been reached.

38. The system for the automated generation of a class definition and naming structure from an event relationship network of claim 37 further comprising a component that determines if there exists a prior connected subnet for a current subnet.

39. The method for the automated generation of a class definition and naming structure from an event relationship network of claim 38 further comprising:

a component that determines the subset of connected events on the prior connected subnet that lead to the current subnet;

a component that assigns the subset of events to a subnet ancestor superclass; and a component that adds the subnet ancestor superclass to an ancestor slot of the current subnet events.

40. The system for the automated generation of a class definition and naming structure from an event relationship network of claim 38 further comprising a component that determines if there is a subsequent connected subnet for a current subnet.

41. The system for the automated generation of a class definition and naming structure from an event relationship network of claim 40 further comprising:

a component that determines the subset of connected events on the subsequent connected subnet that follow from the current subnet;

a component that assigns the subset of events to a subnet descendant superclass; and a component that adds the subnet descendant superclass to a descendant slot of the current subnet events.

42. The system for the automated generation of a class definition and naming structure from an event relationship network of claim 40 further comprising a component that writes a plurality of generated classes to a data file.

43. The system for the automated generation of a class definition and naming structure from an event relationship network of claim 37 further comprising a component that generates a generic correlation template.

44. The system for the automated generation of a class definition and naming structure from an event relationship network of claim 43 further comprising a component that defines a path identification slot, a sequence identification slot, a descendant class and an ancestor class in a data file immediately descendant from a root cause event.

45. The system for the automated generation of a class definition and naming structure from an event relationship network of claim 44 further comprising a component that propagates the path identification slot with a list of path numbers that an event is relevant to in the event relationship network.

46. The system for the automated generation of a class definition and naming structure from an event relationship network of claim 45 wherein the component that propagates a of path identification numbers includes:

a component that, starting at a root node of the event relationship network, proceeds to a nodal event and defines a path leading in to the nodal event with a path identification number of one;

a component that, at the nodal event, continues the inherited path leading in as one path leading out from the nodal event and assigns each remaining path leading out from the nodal event an ascending sequence of path identification numbers;

a component that proceeds to a next nodal event on any path leading out and assigns each remaining path leading out from the next nodal event an ascending sequence of path identification numbers; and a component that propagates the path identification numbers backwards to ensure that events on a path precedent to the nodal event are contained in the list for the path identification slot.

47. The system for the automated generation of a class definition and naming structure from an event relationship network of claim 44 further comprising a component that fills the sequence identification slot with a sequence number for the path.

48. The system for the automated generation of a class definition and naming structure from an event relationship network of claim 47 wherein the component that propagates sequence identification numbers includes:

a component that, starting at a root node of the event relationship network, assigns the sequence numbers down a complete path;

a component that, for each nodal event, continues to assign sequence numbers for each node down any path by increasing a current sequence identification number of each nodal event; and a component that, if an event is fed by more than one incoming path, assigns the event a sequence number that is the highest of each incoming path and increases the sequence identification numbers of any events that follow a current nodal event in the logical sequence.

49. The system for the automated generation of a class definition and naming structure from an event relationship network of claim 44 further comprising a component that, for any event on a subnet which includes a primary subnet and that lies in a logical flow connected to the primary subnet, populates the ancestor class slot with a list of all subnet ancestor class names which are primary to the event and lie on the logical flow.

50. The system for the automated generation of a class definition and naming structure from an event relationship network of claim 44 further comprising a component that, for any event on a subnet which includes a secondary subnet and that lies in a logical flow connected to the secondary event, populates the descendant class slot with a list of all subnet descendant class names which are secondary to the event and lie on the logical flow.

51. The system for the automated generation of a class definition and naming structure from an event relationship network of claim 43 wherein the component that generates a generic correlation template comprises:

for an event of a class within a subnet ancestor class:

a component that makes a current event on the subnet a secondary event; and a component that removes the current event from correlation analysis;

for an event of a class within a subnet descendant class:

a component that makes the current event on the subnet a primary event; and a component that removes the current event from correlation analysis;

for an older event on the subnet in which the path identification of the current event intersects the path identification of the older event:

a component that makes the current event on the subnet a primary event and removes it from correlation analysis, if the sequence identification of the current event is less than the sequence identification of the older event; and a component that makes the current event on the subnet a secondary event and removes it from correlation analysis, if the sequence identification of the current event is greater than the sequence identification of the older event.

* * * * *